(12) United States Patent
Plantan

(10) Patent No.: US 6,888,451 B1
(45) Date of Patent: May 3, 2005

(54) METHOD OF MONITORING THE POWER SPRING OF A SPRING BRAKE ACTUATOR

(75) Inventor: Ronald S. Plantan, Mooresville, NC (US)

(73) Assignee: Indian Head Industries, Inc., Charlotte, NC (US)

( * ) Notice: Subject to any disclaimer, the term of this patent is extended or adjusted under 35 U.S.C. 154(b) by 31 days.

(21) Appl. No.: 10/403,693

(22) Filed: Mar. 31, 2003

(51) Int. Cl.$^7$ ................................................. B60Q 1/00
(52) U.S. Cl. .................. 340/453; 340/454; 188/1.11 E; 188/107
(58) Field of Search ............................ 340/450.1, 452, 340/453, 454, 479; 188/1.11 E, 1.11 W, 107, 170; 303/115.3, 115.4, 162, 186; 73/161

(56) References Cited

U.S. PATENT DOCUMENTS

| 3,741,612 | A | * | 6/1973 | Ando ....................... 303/115.3 |
| 3,759,147 | A | * | 9/1973 | Johnsson et al. .............. 92/19 |
| 3,800,668 | A | | 4/1974 | Valentine ..................... 91/399 |
| 3,829,170 | A | * | 8/1974 | Rockwell et al. ........... 303/186 |
| 4,636,010 | A | * | 1/1987 | Adachi et al. ........... 303/115.4 |
| 4,793,449 | A | * | 12/1988 | Smith ......................... 188/107 |
| 4,960,036 | A | | 10/1990 | Gummer et al. ................ 92/63 |
| 5,308,153 | A | * | 5/1994 | Kidston et al. ............. 303/162 |
| 5,713,238 | A | * | 2/1998 | Pierce et al. .................. 73/161 |
| 6,255,941 | B1 | | 7/2001 | Osterman et al. ........... 340/479 |
| 6,417,768 | B2 | | 7/2002 | Osterman et al. ........... 340/479 |
| 6,623,088 | B2 | * | 9/2003 | Roden et al. ............ 303/113.1 |

FOREIGN PATENT DOCUMENTS

| WO | WO 02/33283 A2 | 4/2002 |
| WO | WO 02/033283 A3 | 4/2002 |

OTHER PUBLICATIONS

PCT/US2004/008970 International Search Report.

* cited by examiner

Primary Examiner—Van T. Trieu
(74) Attorney, Agent, or Firm—Howard & Howard

(57) ABSTRACT

A method of monitoring the condition of a power spring of a pneumatic spring brake actuator of a vehicle by comparing the stroke of the push rod during normal braking and by actuating the parking brake, wherein a defective power spring is indicated when the difference in the push rod stroke falls below a predetermined minimum. The brake actuator may also include a sensor determining the push rod stroke and signal a defective power spring.

7 Claims, 4 Drawing Sheets

METHOD OF MONITORING THE POWER SPRING OF A SPRING BRAKE ACTUATOR

FIELD OF THE INVENTION

This invention relates to a method of monitoring the condition of a power spring of a conventional pneumatic spring brake actuator.

BACKGROUND OF THE INVENTION

As set forth below, the power spring of a pneumatic spring brake actuator serves as the emergency brake in the event of failure of the pneumatic braking system of heavy duty vehicles, including trucks, trailers, buses, motor coaches and the like. The power spring also serves as the parking brake for such vehicles. However, there is no industry recognized method of checking the condition of the power spring of a spring brake actuator other than to disassemble the brake actuator. Further, most spring brake actuators are now tamper resistant, such as disclosed in U.S. Pat. No. 4,960,036 assigned to the Assignee of this application, to avoid inadvertent release of the power spring resulting in death or injury. In a tamper resistant spring brake actuator, the power spring chamber is permanently sealed, such that the spring chamber cannot be opened to visually inspect the power spring. Second, to determine the condition of the power spring of a spring brake actuator, it is necessary to differentiate a decrease, for example, in the push rod stroke resulting from other conditions of the vehicle braking system, including a worn or out of adjustment slack adjuster or foundation brake and other potential failures of the spring brake actuator. Thus, it is not possible to simply measure the stroke of the push rod of a spring brake actuator to determine condition of the power spring.

There is therefore a need for a method to monitor the condition of a power spring of a pneumatic spring brake actuator.

A conventional "piggyback" pneumatic spring brake actuator includes a housing which is divided into a power spring chamber or "spring chamber" and a service chamber, also referred to as the "non-pressure" housing. A power spring is normally compressed in the power spring chamber by the pneumatic pressure of the braking system of the vehicle. In a "dual diaphragm" spring brake actuator, for example, the spring chamber includes a flexible cup-shaped diaphragm and pneumatic pressure from the vehicle reacts against the diaphragm to normally compress the power spring when the vehicle is operating. The power spring chamber further includes a piston having one end biased against the diaphragm and a second end which reciprocates into the service chamber upon expansion of the power spring. The service chamber of a dual diaphragm spring brake actuator also includes a cup-shaped flexible diaphragm and a push rod which is biased against the diaphragm in the service chamber, such that upon normal actuation of the braking system of the vehicle, pneumatic pressure received in the service chamber inverts the diaphragm in the service chamber, which drives the push rod through an opening in the housing to actuate the foundation brake of the vehicle. In a typical application, the push rod is connected to a slack adjuster which is connected to a linkage connected to the foundation brake of the vehicle.

Thus, the braking system of the vehicle is actuated by pneumatic pressure of the vehicle received in the service chamber. Upon depression of the brake pedal the pneumatic pressure inverts the diaphragm in the service chamber, which extends the push rod to actuate the foundation brake of the vehicle. However, when the pneumatic pressure of the vehicle falls below a predetermined minimum pressure or the parking brake is actuated to release pneumatic pressure from the power spring chamber, the power spring expands, driving the piston in the spring chamber into the service chamber, thereby driving the push rod in the service chamber to actuate the foundation brake of the vehicle. Although the power spring of a pneumatic spring brake actuator is generally not subject to failure, at present there is no industry recognized method for periodically checking the condition of the power spring of a spring brake actuator as set forth above. The method of this invention permits monitoring the condition of the power spring of a pneumatic spring brake actuator without disassembling the power spring chamber, permitting periodic checking of the condition of the power spring.

The prior art also discloses various methods and apparatus for monitoring the stroke of the push rod of a spring brake actuator to determine whether the spring brake actuator or the foundation braking system of the vehicle require maintenance. U.S. Pat. No. 6,255,941 assigned to the Assignee of this application discloses a commercial brake monitoring system of the assignee of this application which provides continuous or periodic monitoring of the stroke of the push rod of a brake actuator. However, as set forth above, the prior art does not disclose a method of monitoring the condition of the power spring using this technology. The method of the present invention permits monitoring the condition of the power spring of a spring brake actuator by monitoring the stroke of the push rod and a defective power spring may be signaled to the operator or maintenance person.

SUMMARY OF THE INVENTION

The method of monitoring the condition of the power spring of a pneumatic spring brake actuator of this invention may be utilized to monitor the condition of the power spring in any spring brake actuator which includes a power spring chamber and a service chamber, wherein the power spring is normally compressed in the spring chamber by pneumatic pressure and expands upon release of the pneumatic pressure to drive a push rod in the service chamber to actuate the foundation brake of the vehicle. Thus, the method of monitoring the condition of a power spring of a pneumatic spring brake actuator of this invention is not limited to a dual diaphragm spring brake actuator of the type disclosed herein or the type of push rod monitor utilized.

The method of this invention comprises periodically supplying pneumatic pressure to the service chamber as by actuating the normal braking system of the vehicle and determining a stroke of the push rod. The method further includes periodically releasing pneumatic pressure from the power spring chamber, as by actuating the parking brake, and determining the stroke of the push rod as a result of the expansion of the power spring. Finally, the method of this invention includes comparing the stroke of the push rod as a result of supplying pneumatic pressure to the service chamber and the expansion of the power spring and this comparison is indicative of the condition of the power spring. That is, where the stroke of the push rod in the service chamber as a result of the expansion of the power spring is below a predetermined minimum as compared to the stroke of the push rod as a result of supplying pneumatic pressure to the service chamber, the power spring should be considered defective. As will be understood, a defective power spring may result from loss of tensile strength of the power spring, which may be difficult to detect by simply monitoring the performance of the emergency brake or a broken or cracked power spring. The method of this invention will detect any of these defects in the power spring without requiring disassembly of the brake actuator.

A preferred method of monitoring the condition of the power spring of a spring brake actuator of this invention includes first calculating a "normal" difference in the push rod stroke as a result of supplying pneumatic pressure to the spring chamber and releasing the pneumatic pressure from the power spring chamber and then comparing the calculated difference in the push rod stroke with the measured difference, which reduces error and provides for determination of the condition of the power spring even if the power spring was defective during manufacture of the spring brake actuator where the stroke of the push rod is determined by a sensor system, the sensor system may also be utilized to signal a defective power spring to the operator or a maintenance person. More specifically, a preferred embodiment of the method of monitoring the power spring of a spring brake actuator of this invention includes determining the stroke of the push rod by a sensor associated with the push rod which either periodically or continuously measures the push rod stroke of the spring brake actuator. The sensor may then signal a computer module or controller which provides the data necessary to compare the push rod stroke resulting by supplying pneumatic pressure to the service chamber and by releasing pneumatic pressure from the spring chamber as described above. In a preferred embodiment, the sensor system further includes a controller, preferably a microprocessor controlled controller, which compares the push rod stroke with a predetermined calculated difference and signals the vehicle operator maintenance person of a defective power spring. Thus, the method of monitoring the condition of a power spring of a pneumatic spring brake actuator of this invention is independent of other conditions of the braking system of the vehicle including, for example, a worn or out of adjustment slack adjuster or foundation brake and other potential failures of the spring brake actuator. Other advantages and meritorious features of the method of monitoring the condition of a power spring of a spring brake actuator of this invention will be more fully understood from the following description of the preferred embodiments, the appended claims and the drawings, a brief description of which follows.

DESCRIPTION OF THE PREFERRED EMBODIMENTS

Figure 1:
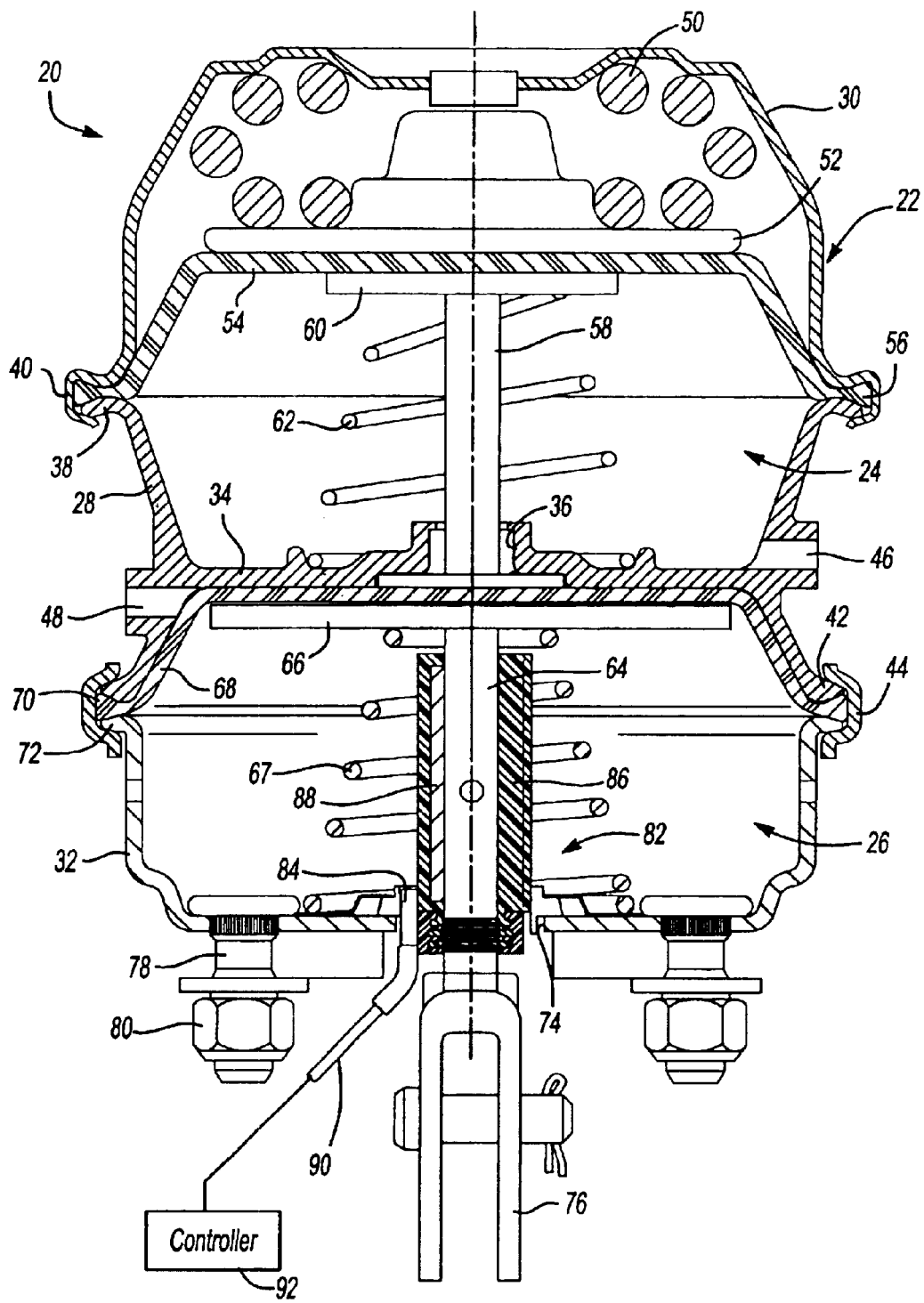
FIG. 1 is a side cross-sectional view of a conventional piggyback dual diaphragm spring brake actuator having a push rod stroke monitoring system.

FIG. 1 illustrates one embodiment of a commercial pneumatically operated spring brake actuator 20 which includes a housing 22 enclosing a spring chamber 24 and a service chamber 26. This type of spring brake actuator is commonly referred to as a "piggyback" spring brake actuator because the spring chamber 24 and service chamber 26 are incorporated in one housing. In the disclosed embodiment, the housing 22 includes a flange case 28, which may be formed from an aluminum casting or other suitable materials, a cup-shaped spring chamber cover or head 30 and a cup-shaped service chamber housing 32. The flange case 22 includes an integral central web portion 34 which separates the spring chamber 24 from the service chamber 26 having a central opening 36, a first radial flange portion 38, which receives an integral skirt portion 40 of the spring chamber head 30, and a second radial portion 42 which typically receives a bolted clamp ring 44. The flange case 22 further includes a pneumatic port 46 in fluid communication with the spring chamber 24 and a pneumatic port 48 in fluid communication with the service chamber 26.

The spring chamber 24 includes a power spring 50 which is normally compressed during operation of the vehicle between an end of the head 30 and a spring plate or spring guide 52 as shown in FIG. 1. The spring chamber 24 further includes a flexible cup-shaped diaphragm 54 having a radial rim portion 56 which is compressed and sealed between a radial portion of the integral skirt portion 40 of the head 30 and the radial rim 38 of the flange case 28. As described in the above-referenced U.S. Pat. No. 4,960,036, the skirt portion 40 is permanently deformed around the radial rim portion 38 of the flange case to provide a tamper resistant assembly preventing inadvertent opening of the service chamber 24 and release of the power spring 50 to prevent potential injury of inexperienced personnel. In this embodiment, the power spring 50 is a powerful coil spring. However, as set forth above, the method of monitoring the condition of the power spring 50 of this invention is not limited to the type of power spring utilized or a tamper resistant spring brake actuator. The spring chamber further includes a piston 58 having a piston head 60 biased against the central portion of the diaphragm 54 by a small return spring 62 as shown in FIG. 1.

The service chamber 26 includes a reciprocable push rod 64 having a push rod plate 66 which is spring biased against the cup-shaped flexible diaphragm 68 in the service chamber 26 as shown in FIG. 1. The diaphragm 68 in the service chamber 26 also includes a radial rim portion 70 which is compressed between the radial rim portion 42 of the flange case 28 and the radial rim 72 of the service chamber housing 32 and the service chamber housing 32 is generally retained to the flange case by the bolted ring clamp band 44. As described below, the end portion of the push rod 64 reciprocates through an opening 74 in the service chamber housing 32 and typically includes a clevis 76 for pivotal attachment to a slack adjuster (not shown) which is connected by a linkage (not shown) to the foundation brake (not shown) of a heavy vehicle. In a typical application, the spring brake actuator 20 is attached to a bracket on the under carriage of the vehicle (not shown) by bolts 78 which threadably receive nuts 80.

Figure 2:
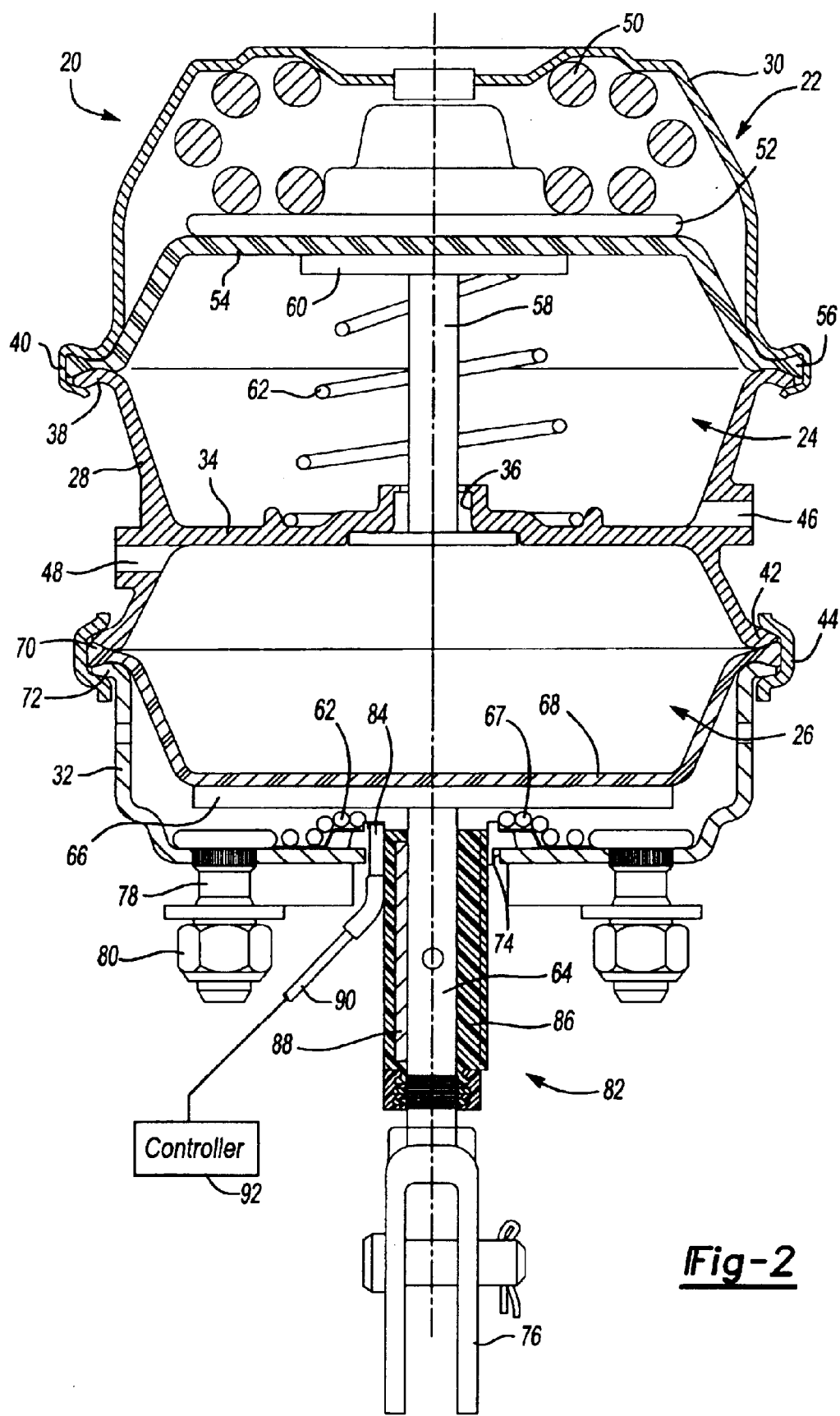
FIG. 2 is a side cross-sectional view of the spring brake actuator shown in FIG. 1 upon receipt of pneumatic pressure in the service chamber.
Figure 3:
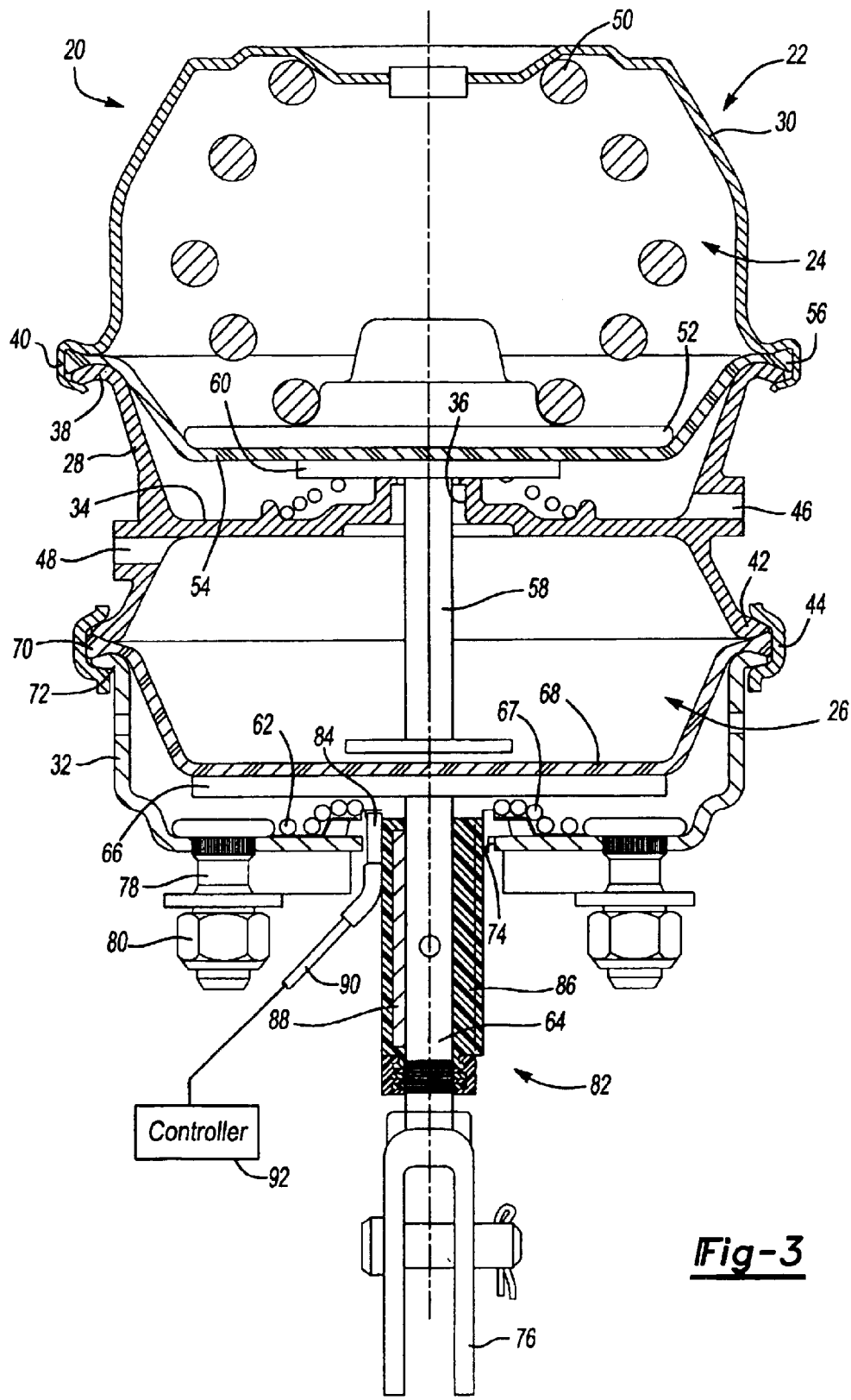
FIG. 3 is a side cross-sectional view of the spring brake actuator shown in FIG. 1 upon removal of pneumatic pressure from the spring brake chamber and expansion of the power spring.

In the disclosed embodiment of the spring brake actuator 20 shown in FIGS. 1 to 3, the brake actuator assembly includes a push rod stroke monitor 82 described in detail in the above-referenced U.S. Pat. No. 6,255,941. Briefly, the brake monitor 82 includes a sensor 84, such as a Hall-effect sensor, and the push rod includes a sleeve 86 affixed to the push rod 64 having a magnet 88. As described in the above-referenced U.S. Pat. No. 6,255,941, the push rod stroke monitor 82 senses the stroke of the push rod 64 and may be utilized to determine an "overstroke" condition of the push rod, indicating that the foundation brake of the vehicle or the slack adjuster requires adjustment or repair, or a "hanging brake" condition, wherein the parking brake is not released after start-up. The sensor 84 may then be "hard wired" by wire 90 to a controller 92 which may be connected to a display (not shown) in the vehicle cab or the sensor 82 may include an RF chip, for example, which signals a receiver in the vehicle cab or a maintenance facility.

The push rod stroke monitor 82 may also be utilized to continuously monitor the axial position of the push rod 64. As stated above, however, the method of or apparatus for monitoring the condition of the power spring 50 of this invention is not limited to the type of push rod stroke monitor utilized.

FIGS. 2 and 3 illustrate the steps of the method of monitoring the condition of the power spring 50 of this invention as described below. As will be understood, FIG. 1 illustrates the spring brake actuator during normal operation of the vehicle, wherein pneumatic pressure is received from the vehicle through the port 46 to the spring chamber 24, thereby compressing the power spring 50 as shown and the service chamber 26 is not pressurized, except during braking. In FIG. 2, the normal braking system of the vehicle is actuated, wherein pneumatic pressure is received through port 48 which inverts the diaphragm 68 in the service chamber 26 thereby reciprocating the push rod 64 and the sensor sleeve 86 as shown in FIG. 2. As set forth below, the method of this invention then includes determining the stroke of the push rod 64 using the push rod stroke monitor 82 but the stroke of the pushrod could also be determined manually. As used herein, the term "stroke" refers to the distance the push rod 64 moves between the position shown in FIG. 1 and the position shown in FIG. 2. It is important to note that the power spring 50 remains compressed during normal actuation of the vehicle braking system as shown in FIG. 2 because the vehicle pneumatic pressure is normally received through port 46 from the vehicle during normal operation of the vehicle and the pressure in the spring chamber 24 maintains the diaphragm 54 as shown.

FIG. 3 illustrates another step of the method of monitoring the condition of a power spring of this invention, wherein the pneumatic pressure in the spring chamber 24 is "released" as by actuating the parking brake of the vehicle, causing the power spring 50 to expand, thereby inverting the diaphragm 54 in the spring chamber 24 and driving the piston 58 axially. The piston 58 then inverts the diaphragm 68 in the service chamber 26, thereby reciprocating or driving the push rod 64 axially as shown in FIG. 3. The pneumatic pressure in the spring chamber 24 may be released by actuating the parking brake of the vehicle. The stroke of the push rod 64 is then measured by the push rod stroke monitor 82 as described above or the stroke is measured manually. It should be understood that the sequence of the method steps shown in FIGS. 2 and 3 is irrelevant because the next step of the method of monitoring the condition of the power spring 50 is to compare the push rod stroke obtained by actuating the foundation brake of the vehicle as shown in FIG. 2 and by actuating the emergency brake as shown in FIG. 3. As set forth below, the "normal" difference can also be calculated.

Figure 4:
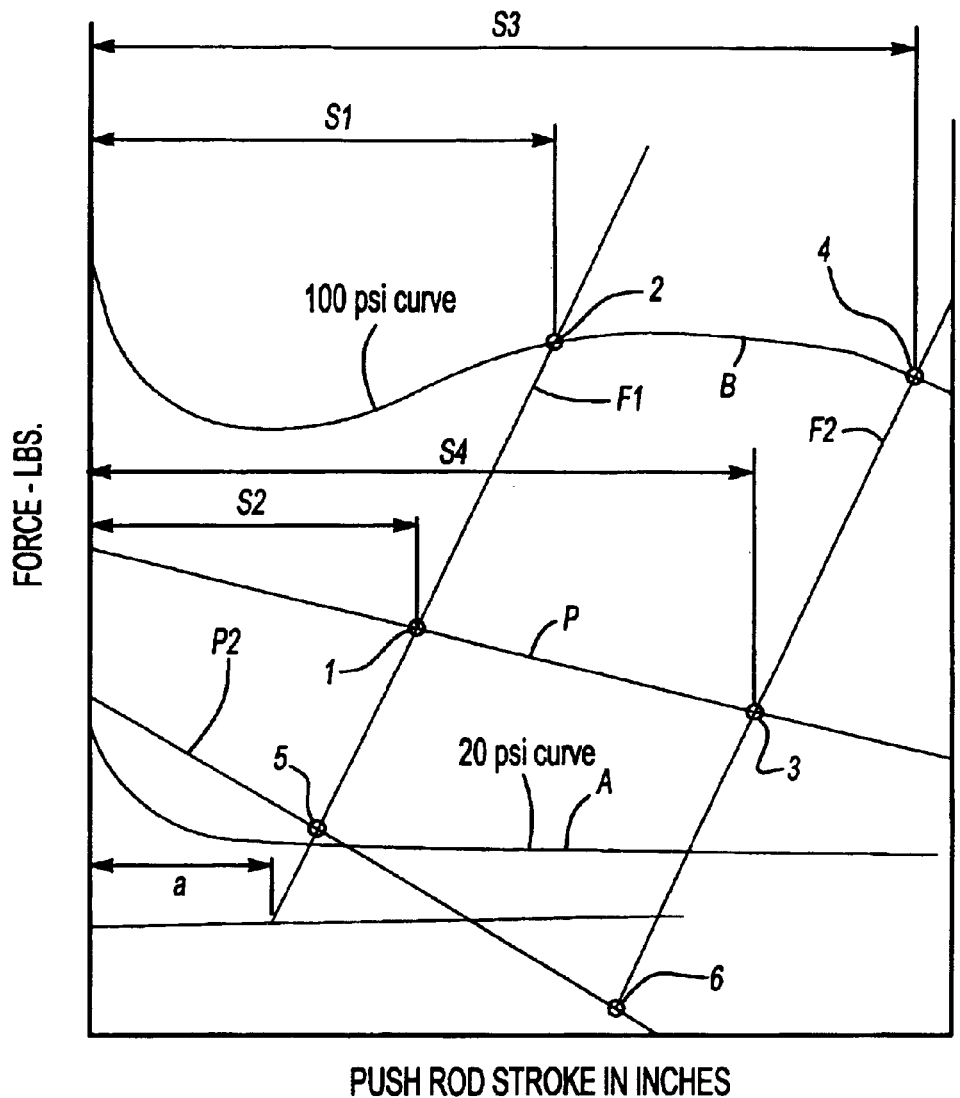
FIG. 4 is a chart for calculation of the normal difference between the stroke of the push rod under the conditions of FIGS. 2 and 3.

FIG. 4 is a graph of force versus push rod stroke, which may be determined for any pneumatic spring brake actuator depending upon the type of brake actuator, the pneumatic pressure of the vehicle and the area of the diaphragms. As will be understood, any brake actuator has a predetermined "free stroke" shown at "a" in FIG. 4, which is the clearance provided by the components. The lower curve "A" is the force of actuation or output which is normally 20 psi in a conventional heavy vehicle. The force of the parking brake is provided by the power spring, which is a coil spring 50 in the disclosed embodiment and therefore decreases as the push rod stoke increases in a straight line function as shown at "P" in FIG. 4. Finally, the force of normal braking of the vehicle is provided by a combination of factors including the diaphragm and is therefore a curvilinear function over the push rod stroke, shown at "B" in FIG. 4. As will be understood by those skilled in this art, the foundation brake of the vehicle provides a counter-force to the brake actuator. That is, it pushes back against the force of the brake actuator when the brake shoe contacts the brake drum. This counter-force, however, depends upon the condition of the foundation brake. The counter-force provided by the foundation brake of the vehicle is represented by two upwardly inclined lines in FIG. 4 namely "F1" and "F2" wherein F2 indicates a worn foundation brake of the vehicle and F1 is the counter-force provided by a normal foundation brake. As shown in FIG. 4, F1 intersects line P at a first "match point" 1 and line B at a second "match point" 2. Similarly, the intersection of line F2, which is the counterforce provided by a worn foundation brake, intersects line P at "match point" 3 and line B at "match point" 4. However, the difference between S3 and S4 is substantially equal to the difference between S1 and S2. Thus, the method of monitoring the power spring of a spring brake actuator of this invention is not dependent upon the condition of the foundation brake of the vehicle, but will provide an accurate determination of the condition of the power spring regardless of whether the slack adjuster or foundation brake is worn or out of adjustment. These match points are then used to calculate the push rod stroke provided by the brake actuator during normal braking "S1" or "S3" as shown in FIG. 2 and the parking brake or power spring as shown in FIG. 3 and at "S2" or "S4" in FIG. 4 for a nondefective power spring. Thus, the distance between S1 and S2 can be calculated for a nondefective power spring and where the measured difference is substantially less than the calculated difference, the power spring 50 should be considered defective. However, line "P2" in FIG. 4 is one example of the force versus stroke of a defective power spring, wherein the distance between the match points 5 and 6 is less than the difference between the match points generated by line P indicating a defective spring.

In a preferred embodiment of the method of monitoring a power spring of a spring brake actuator of this invention, wherein the push rod stroke sensor system 84 includes a computer module or controller, preferably a microprocessor controlled controller coupled to the sensor to receive a signal from the sensor, the controller then compares the difference in the push rod stroke resulting from supplying pneumatic pressure to the service chamber, such as by actuating the braking system of the vehicle, and releasing pneumatic pressure from the power spring chamber, as by actuating the parking brake with a predetermined difference for a nondefective power spring determined for a specific model or type of spring brake actuator as shown in FIG. 4 and the controller then signals a defective power spring when the measured difference is less than the predetermined difference.

The method of monitoring the condition of the power spring of a pneumatic spring brake actuator of this invention thus includes periodically supplying pneumatic pressure to the service chamber such as by activating the normal braking function of the vehicle and determining the stroke of the push rod as shown in FIG. 2. The method further includes periodically releasing the pneumatic pressure from the power spring chamber as by actuating the parking brake as shown in FIG. 3 and determining the push rod stroke as shown in FIG. 3. Finally, the method of this invention includes comparing the stroke of the push rod resulting from the actuation of the braking system of the vehicle as shown in FIG. 2 and actuation of the parking brake as shown in FIG. 3 to determine the condition of the power spring. As described above, where this difference falls below a predetermined minimum, the power spring should be considered defective. However, as described above in regard to FIG. 4, the difference in the push rod stroke between the normal braking function S1 or S3 and the parking function S2 or S4 can also be calculated for a particular type or model of a spring brake actuator as described above in regard to FIG. 4, and the controller 92 of the sensor system 82 can be programmed to provide an automatic warning to the owner or operator of the vehicle that the power spring 50 is defective. In the disclosed embodiment of the sensor system 82, the sensor 84 is connected by wire 90 to a microprocessor or controlled module 92 or controller as disclosed in the above referenced U.S. Pat. No. 6,255,941 which includes software which may be programmed to compare the push rod stroke during braking and parking with the predetermined difference for a nondefective power spring. Alternatively, an RF chip maybe used to provide a signal.

As set forth in more detail in U.S. Pat. No. 6,255,941, the sensor system 82 provides a signal of the push rod stroke to a receiver which may be a hand-held receiver or a receiver located in the cab of the vehicle. This signal is then processed by the software of a computer module to indicate an overstroke push rod condition or a hanging brake as described in this patent. However, the computer software can also be programmed to indicate a defective power spring by comparing the push rod stroke during normal braking as shown in FIG. 2 and during parking as shown in FIG. 3 and provide a warning, such as a warning light, in the vehicle cab of a defective power spring.

Having described a preferred embodiment of the method of monitoring the condition of a power spring of a pneumatic spring brake actuator of this invention, it will be understood by those skilled in this art that various modifications may be made within the purview of the appended claims. For example, as set forth above, the method of this invention is not limited to the type of spring brake actuator and the push rod stroke versus force shown in FIG. 4 may be calculated for any conventional type or model of spring brake actuator. That is, the method of monitoring the condition of a power spring of this invention is not limited to a dual diaphragm spring brake actuator of the type described. Further, as set forth above, the stroke of the push rod may be periodically or continuously measured during normal braking and parking by any suitable sensor system and the push rod stroke could also be measured manually. Having described a preferred embodiment of the method of monitoring the condition of a power spring of a pneumatic spring brake actuator, the invention is now claimed as follows.

What is claimed is:

1. A method of monitoring the condition of a power spring of a pneumatic spring brake actuator of a vehicle braking system, said spring brake actuator including a housing having a power spring chamber and a service chamber, a power spring in said power spring chamber biased against a piston and said piston operatively engaging a push rod in said service chamber, a pneumatic port in said power spring chamber normally supplying pneumatic pressure to said power spring chamber and compressing said power spring, and a pneumatic port in said service chamber independently supplying pneumatic pressure to said service chamber upon actuation of said vehicle braking system, extending said push rod to actuate said braking system, said method comprising the following steps:

(a) periodically supplying pneumatic pressure to said service chamber and determining a stroke of said push rod;

(b) periodically releasing pneumatic pressure from said power spring chamber and determining a stroke of said push rod; and (c) periodically comparing said stroke of said push rod from steps (a) and (b) to determine said condition of said power spring.

2. The method of monitoring the condition of a power spring of a pneumatic spring brake actuator as defined in claim 1, wherein said method includes determining a difference in said push rod stroke resulting from pneumatic pressure supplied to said service chamber and said power spring in said power spring chamber having a nondefective power spring and comparing said stroke of said push rod in steps (a) and (b) above with a calculated normal difference to determine said condition of said power spring.

3. The method of monitoring the condition of a power spring of a pneumatic spring brake actuator as defined in claim 1, wherein said pneumatic spring brake actuator includes a sensor associated with said push rod indicating said stroke of said push rod and said method including determining said stroke of said push rod by said sensor.

4. The method of monitoring the condition of a power spring of a pneumatic spring brake actuator as defined in claim 3, wherein said method includes signaling a defective power spring by said sensor when a difference between said stroke of said push rod provided by supplying pneumatic pressure to said service chamber and said stroke of said push rod provided by releasing pneumatic pressure from said power spring chamber falls below a predetermined minimum.

5. The method of monitoring the condition of a power spring of a pneumatic spring brake actuator as defined in claim 3, wherein said spring brake actuator includes a controller coupled to said sensor to receive a signal from said sensor and said controller comparing said stroke of said push rod determined by steps (a) and (b) with a predetermined difference and said controller signaling a defective power spring.

6. A method of monitoring the condition of a power spring of a pneumatic spring brake actuator of a vehicle braking system, said spring brake actuator including a housing having a power spring chamber and a service chamber, a push rod in said service chamber adapted to extend through an opening in said service chamber to actuate said vehicle braking system upon introduction of pneumatic pressure into said service chamber, a power spring in said power spring chamber normally compressed by pneumatic pressure in said power spring chamber adapted to expand upon release of pneumatic pressure from said power spring chamber and drive said push rod to actuate said vehicle braking system, a sensor associated with said push rod measuring a stroke of said push rod and a controller coupled to said sensor signaling said stroke of said push rod, said method comprising the following steps:

supplying pneumatic pressure to said service chamber and determining said stroke of said push rod with said sensor;

releasing pneumatic pressure from said power spring chamber and determining said stroke of said push rod with said sensor; and determining the difference of said stroke of said push rod by supplying pneumatic pressure to said service chamber and releasing pneumatic pressure from said power spring chamber to determine said condition of said power spring.

7. The method of monitoring the condition of a power spring of a pneumatic spring brake actuator as defined in claim 6, wherein said method includes determining a predetermined difference in said stroke of said push rod of a brake actuator having a nondefective power spring and said controller then comparing said predetermined difference with said difference of said stroke of said push rod by supplying pneumatic pressure to said surface chamber and releasing pneumatic pressure from said power spring chamber.

\* \* \* \* \*

UNITED STATES PATENT AND TRADEMARK OFFICE
CERTIFICATE OF CORRECTION

PATENT NO. : 6,888,451 B1
DATED : May 3, 2005
INVENTOR(S) : Ronald Plantan

It is certified that error appears in the above-identified patent and that said Letters Patent is hereby corrected as shown below:

Title page,
Item [*] Notice, should read -- One hundred fifty-one (151) days --.

Signed and Sealed this

Twenty-fourth Day of January, 2006

JON W. DUDAS
*Director of the United States Patent and Trademark Office*